(12) United States Patent
Ikeda et al.

(10) Patent No.: US 7,898,620 B2
(45) Date of Patent: Mar. 1, 2011

(54) TRANSMISSIVE LIQUID CRYSTAL DISPLAY DEVICE

(75) Inventors: Satoru Ikeda, Yokohama (JP); Tetsuya Uesaka, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 0 days.

(21) Appl. No.: 12/094,404

(22) PCT Filed: Feb. 27, 2007

(86) PCT No.: PCT/JP2007/054128

§ 371 (c)(1),
(2), (4) Date: May 21, 2008

(87) PCT Pub. No.: WO2007/135797

PCT Pub. Date: Nov. 29, 2007

(65) Prior Publication Data

US 2009/0284689 A1 Nov. 19, 2009

(30) Foreign Application Priority Data

May 24, 2006 (JP) .............................. 2006-143920

(51) Int. Cl.
G02F 1/1335 (2006.01)
(52) U.S. Cl. ..................................................... 349/117
(58) Field of Classification Search ....................... None
See application file for complete search history.

(56) References Cited

U.S. PATENT DOCUMENTS

| 5,578,243 | A | 11/1996 | Mazaki et al. |
| 2003/0025862 | A1 | 2/2003 | Yoda |
| 2008/0192191 | A1* | 8/2008 | Nakamura et al. ........... 349/117 |
| 2009/0161053 | A1* | 6/2009 | Kaneiwa et al. ............. 349/117 |

FOREIGN PATENT DOCUMENTS

| EP | 0 926 534 A2 | 6/1999 |
| EP | 0 646 829 B1 | 7/2002 |
| JP | 6-347742 A | 12/1994 |
| JP | 2640083 B2 | 5/1997 |
| JP | 11-194325 A | 7/1999 |
| JP | 11-194371 A | 7/1999 |
| JP | 2001-235747 A | 8/2001 |
| JP | 2005-202101 A | 7/2005 |

* cited by examiner

*Primary Examiner*—Sung H Pak
(74) *Attorney, Agent, or Firm*—Panitch Schwarze Belisario & Nadel LLP

(57) ABSTRACT

The present invention provides a transmissive liquid crystal display device which is less in variation in displaying characteristics, bright in displaying image, high in contrast and less in viewing angle dependency. The liquid crystal display comprises at least a specific first optically anisotropic layer with a fixed nematic hybrid orientation structure and a specific second optically anisotropic layer.

20 Claims, 8 Drawing Sheets

TRANSMISSIVE LIQUID CRYSTAL DISPLAY DEVICE

CROSS-REFERENCE TO RELATED APPLICATIONS

This application is a Section 371 of International Application No. PCT/JP2007/054128, filed Feb. 27, 2007, which was published in the Japanese language on Nov. 29, 2007, under International Publication No. WO 2007/135797 A1 and the disclosure of which is incorporated herein by reference.

BACKGROUND OF THE INVENTION

The present invention relates to transmissive liquid crystal display devices used for office automation (OA) equipment such as word processors and personal computers, mobile information terminals such as a personal digital assistants and mobile telephones, or camcorders equipped with a liquid crystal monitor.

A liquid crystal display device usually comprises a liquid crystal cell, a polarizer and an optical compensation sheet (retardation plate). A transmissive liquid crystal display device comprises a pair of polarizers, a liquid crystal cell sandwiched therebetween, a single or plurality of optical compensation sheets disposed between the liquid crystal cell and either one or both of the polarizers.

The liquid crystal cell comprises rod-like liquid crystalline molecules, a pair of substrate for enclosing the molecules and electrode layers for applying an electric voltage to the molecules. Examples of the mode of a liquid crystal cell include TN (Twisted Nematic), STN (Super Twisted Nematic), ECB (Electrically Controlled Birefringence), IPS (In-Plane Switching), VA (Vertical Alignment), OCB (Optically Compensated Birefringence), HAN (Hybrid-Aligned Nematic), ASM (Axially Symmetric Aligned Microcell), Half Tone Gray Scale modes, domain divided mode, and display modes using a ferroelectric liquid crystal and an antiferroelectric liquid crystal.

The transmissive liquid crystal display devices can not avoid problems concerning viewing angle such as reduced display contrast, changes in display color and reversed gradation occurring when viewed obliquely because of the refractive index anisotropy of the liquid crystal molecules and thus has been demanded to be improved in these regards.

For a transmissive liquid crystal display device using a TN mode (twisted angle of liquid crystal is 90 degrees), a method for solving these problems has been proposed and practically used wherein optical compensation films are disposed between the liquid crystal cell and each of the upper and lower polarizers.

For example, there are known some structures wherein an optical compensation film composed of hybrid-aligned discotic liquid crystal or nematic hybrid-aligned liquid crystalline polymer is disposed between the liquid crystal cell and each of the upper and lower polarizers (Patent Document Nos. 1 to 3 below).

However, the TN mode can improve the range where contrast widens but is wide in the range where gradation reverses and thus is not necessarily sufficient in viewing angle characteristics. This is because the range where gradation reverses is widened by the molecules in the liquid crystal cell slanting up to the 90 degree direction due to that the liquid crystal layer is twisted at 90 degrees.

For the reasons described above, the mode of a liquid crystal cell is preferably a display mode using an ECB mode wherein the liquid crystal molecules are twisted at an angle of zero degree and homogeneously aligned in the sense of narrowing the range where gradation reverses. An arrangement for improving the viewing angle of the ECB mode is proposed wherein two nematic hybrid-aligned optical compensation films and two uniaxial retardation films are disposed so that each of the compensation films and each of the retardation films are located above and below the homogeneous liquid crystal cell, respectively (Patent Document No. 4).

However, this method can not solve the problems concerning viewing angle such as reduced display contrast, changes in display color and reversed gradation occurring when the liquid crystal display device is viewed obliquely and has left problems including large fluctuations in displaying characteristics due to the variation in the parameter of each film, the increased total film thickness, and the lower reliability of the device because of the use of four film in total above and below the cell, all of which have been demanded to improve.

(1) Patent Document No. 1: Japanese Patent Publication No. 2640083
(2) Patent Document No. 2: Japanese Laid-Open Publication No. 11-194325
(3) Patent Document No. 3: Japanese Laid-Open Publication No. 11-194371
(4) Patent Document No. 4: Japanese Laid-Open Publication No. 2005-202101

BRIEF SUMMARY OF THE INVENTION

The present invention intends to solve the above-described problems and provide a transmissive liquid crystal display device that is less in fluctuations, bright in display images, high in contrast and less in viewing angle dependency.

According to a first aspect of the present invention, there is provided a transmissive liquid crystal display device comprising at least: a backlight; a polarizer; a second optically anisotropic layer with a retardation of 80 to 180 nm at a wavelength of 550 nm; a first optically anisotropic layer with a retardation of 50 to 140 nm at a wavelength of 550 nm; a homogeneously aligned liquid crystal cell comprising upper and lower substrates facing each other and a liquid crystal layer sandwiched between the upper and lower substrates; and a polarizer, arranged in piles in this order from the backlight, the first optically anisotropic layer comprising at least a liquid crystal film with a fixed nematic hybrid liquid crystal orientation structure.

According to a second aspect of the present invention, there is provided a transmissive liquid crystal display device comprising at least: a backlight; a polarizer; a homogeneously aligned liquid crystal cell comprising upper and lower substrates facing each other and a liquid crystal layer sandwiched between the upper and lower substrates; a first optically anisotropic layer with a retardation of 50 to 140 nm at a wavelength of 550 nm; a second optically anisotropic layer with a retardation of 80 to 180 nm at a wavelength of 550 nm; and a polarizer, arranged in piles in this order from the backlight, the first optically anisotropic layer comprising at least a liquid crystal film with a fixed nematic hybrid liquid crystal orientation structure.

According to a third aspect of the present invention, there is provided a transmissive liquid crystal display device comprising at least: a backlight; a polarizer; a first optically anisotropic layer with a retardation of 50 to 140 nm at a wavelength of 550 nm; a second optically anisotropic layer with a retardation of 80 to 180 nm at a wavelength of 550 nm; a homogeneously aligned liquid crystal cell comprising upper and lower substrates facing each other and a liquid crystal layer sandwiched between the upper and lower substrates; and a polarizer, arranged in piles in this order from the backlight, the first optically anisotropic layer comprising at least a liquid crystal film with a fixed nematic hybrid liquid crystal orientation structure.

According to a fourth aspect of the present invention, there is provided a transmissive liquid crystal display device comprising at least: a backlight; a polarizer; a homogeneously aligned liquid crystal cell comprising upper and lower substrates facing each other and a liquid crystal layer sandwiched between the upper and lower substrates; a second optically anisotropic layer with a retardation of 80 to 180 nm at a wavelength of 550 nm; a first optically anisotropic layer with a retardation of 50 to 140 nm at a wavelength of 550 nm; and a polarizer, arranged in piles in this order from the backlight, the first optically anisotropic layer comprising at least a liquid crystal film with a fixed nematic hybrid liquid crystal orientation structure.

According to a fifth aspect of the present invention, there is provided the transmissive liquid crystal display device according to any one of the first to fourth aspects, wherein the second optically anisotropic layer is a stretched polymer film.

According to a sixth aspect of the present invention, there is provided the transmissive liquid crystal display device according to any one of the first to fourth aspects, wherein the second optically anisotropic layer is a liquid crystal film produced by fixing a liquid crystalline substance exhibiting an optically positive uniaxiality, in a nematic orientation formed when the substance is in the liquid crystal state.

According to a seventh aspect of the present invention, there is provided the transmissive liquid crystal display device according to any one of the first to fourth aspects, wherein the angle defined by the tilt direction of the hybrid direction of the liquid crystal film forming the first optically anisotropic layer, projected to a plane and the rubbing direction of the liquid crystal layer is in the range of 30 degrees or smaller.

According to an eighth aspect of the present invention, there is provided the transmissive liquid crystal display device according to any one of the first to fourth aspects, wherein the angle defined by the tilt direction of the hybrid direction of the liquid crystal film forming the first optically anisotropic layer, projected to a plane and the slow axis of the second optically anisotropic layer is in the range of 70 degrees or larger and smaller than 110 degrees.

According to a ninth aspect of the present invention, there is provided the transmissive liquid crystal display device according to any one of the first to fourth aspects, wherein the first optically anisotropic layer is a liquid crystal film produced by fixing a liquid crystalline substance exhibiting an optically positive uniaxiality, in a nematic hybrid orientation formed when the substance is in the liquid crystal state, and the average tilt angle of the nematic hybrid orientation is in the range of 5 to 45 degrees.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
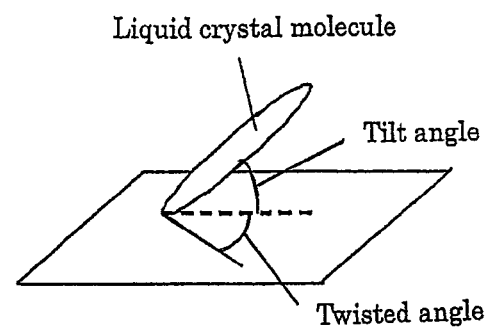
FIG. 1 is a conceptual view for describing the tilt and twisted angles of a liquid crystal molecule.

The transmissive liquid crystal display device of the present invention has a configuration selected from the following four patterns and if necessary may contain components such as a light diffusing layer, a light control film, a light guide plate and a prism sheet, on which no particular restriction is imposed. Any of the configuration patterns (1) to (4) may be used in order to obtain optical characteristics with less viewing angle dependency.

(1) polarizer/liquid crystal cell/first optically anisotropic layer/second optically anisotropic layer/polarizer/backlight (2) polarizer/second optically anisotropic layer/first optically anisotropic layer/liquid crystal cell/polarizer/backlight (3) polarizer/liquid crystal cell/second optically anisotropic layer/first optically anisotropic layer/polarizer/backlight (4) polarizer/first optically anisotropic layer/second optically anisotropic layer/liquid crystal cell/polarizer/backlight.

The liquid crystal cell used in the present invention will be described below.

The mode of the liquid crystal cell used in the present invention is a homogeneously aligned cell mode. The homogeneously aligned cell used herein is a cell with a twisted angle of substantially zero degree. The term "substantially zero degree" refers to an angle of zero degree or greater and 5 degrees or smaller. The retardation (Δnd) of the liquid crystal cell is preferably from 200 to 400 nm, more preferably from 230 to 350 nm. A retardation deviating from these ranges is not preferable because undesired coloration or reduced brightness would be invited.

There is no particular restriction on the driving mode of the liquid crystal cell, which may, therefore, be a passive matrix mode used in an STN-LCD, an active matrix mode using active electrodes such as TFT (Thin Film Transistor) electrodes and TFD (Thin Film Diode) electrodes, and a plasma address mode.

The liquid crystal cell is composed of a liquid crystal layer sandwiched between two transparent substrate disposed to face each other (the viewer's side substrate may be referred to as "upper substrate" and the backlight side's substrate may be referred to as "lower substrate").

There is no particular restriction on the material forming the liquid crystal layer. Examples of the material include various low molecular weight liquid crystalline substances, polymeric liquid crystalline substances, and mixtures thereof, which can constitute various liquid crystal cells. The liquid crystalline material may be blended with dyes, chiral dopoants, or non-liquid crystalline substances to an extent that they do not prevent the liquid crystal substance from exhibiting liquid crystallinity. The liquid crystal cell may be provided with various components required for the above-described various liquid crystal cell modes or various components described below.

There is no particular restriction on the transparent substrates forming the liquid crystal cell as long as they can align a liquid crystalline material forming a liquid crystal layer in a specific alignment direction. More specific examples include those which themselves have a property of aligning a liquid crystalline material and those which themselves have no capability of aligning but are provided with an alignment layer capable of aligning a liquid crystalline material. The electrode of the liquid crystal cell may be any conventional electrode, such as ITO. The electrode may be usually arranged on the surface of the transparent substrate, which surface contacts the liquid crystal layer. In the case of using a transparent substrate with an alignment layer, an electrode may be provided between the alignment layer and the substrate.

There is no particular limitation on the polarizer used in the present invention as long as the objects of the present invention can be achieved. Therefore, the polarizer may be any conventional ones that are generally used in liquid crystal display devices. Specific examples include PVA-based polarizing films such as polyvinyl alcohol (PVA) and partial acetalized PVA, polarizing films such as those produced by stretching a hydrophilic polymeric film comprising a partially saponified product of an ethylene-vinyl acetate copolymer and absorbing iodine and/or dichroic dye, and those comprising a polyene-oriented film such as a dechlorinated product of polyvinyl chloride. Alternatively, there may be used reflection type polarizers.

These polarizers may be used alone or in combination with a transparent protective layer provided on one or both surfaces of the polarizer for the purpose of enhancing the strength, moisture resistance, and heat resistance. Examples of the protective layer include those formed by laminating a transparent plastic film such as polyester, triacetyl cellulose or a cyclic olefin polymer directly or via an adhesive layer on the polarizer; coated layers of transparent resin; and acrylic- or epoxy-based photo-setting type resin layers. When the protective layers are coated on the both surfaces of the polarizing film, they may be the same or different from one another.

There is no particular restriction on the second optically anisotropic layer used in the present invention as long as it is excellent in transparency and uniformity. However, the layer is preferably a polymeric stretched film or an optical film formed from a liquid crystalline material. Examples of the polymeric stretched film include uniaxial or biaxial retardation films formed from cellulose-, polycarbonate-, polyarylate-, polysulfone-, polyacryl, polyethersulfone-, or cyclic olefin-based polymers. The second optically anisotropic layer exemplified herein may be composed of a polymeric stretched film or an optical film formed from a liquid crystalline material alone or the combination thereof. Among these polymeric stretched films, preferred are cyclic olefin-based polymers because they are cost effective and can suppress the change of color modulation of image quality due to their film uniformity and small birefringence wavelength dispersion. Examples of the optical film formed from a liquid crystalline material include those comprised of various liquid crystalline polymeric compounds of main chain- and/or side chain-types, such as liquid crystalline polyesters, liquid crystalline polycarbonates, liquid crystalline polyacrylates, or low molecular weight liquid crystalline compounds having reactivities which can be polymerized by cross-linking or the like after being aligned. These films may be a single-layered film with self-supportivity or formed over a transparent supporting substrate.

The retardation value of the second optically anisotropic layer at a wavelength of 550 nm is so adjusted to be from 80 to 180 nm. The retardation value is preferably from 100 to 160 nm. A retardation value of less than 80 nm or greater than 180 nm is not preferable because a sufficient compensation effect may not be obtained.

The first optically anisotropic layer used in the present invention is a layer comprising at least a liquid crystal film produced by fixing a liquid crystalline polymer exhibiting an optically positive uniaxiality, more specifically a polymeric liquid crystalline compound exhibiting an optically positive uniaxiality or a polymeric liquid crystal composition containing at least one type selected from the polymeric liquid crystalline compounds and exhibiting an optically positive uniaxiality, in a nematic hybrid orientation with an average tilt angle of 5 to 45 degrees, formed when the liquid crystalline polymeric compound or composition is in a liquid crystal state.

The term "nematic hybrid orientation" used herein refers to an orientation structure wherein the liquid crystal molecules are aligned in a nematic orientation wherein the angles of the directors of the liquid crystalline molecules relative to the film upper surface and the lower film surface are different from each other. Therefore, since the angles formed by the directors and the film planes are different between in the vicinities of the upper and lower interfaces of the film, the nematic hybrid orientation can be referred to as an orientation wherein the angles vary continuously between the upper and lower film surfaces.

In a liquid crystal film with a fixed nematic hybrid orientation structure, the directors of the liquid crystalline molecules are directed at different angles in all the positions in the film thickness direction. Therefore, it can be said that there no longer exists optical axis in the whole film structure.

The term "average tilt angle" used herein refers to an average value of the angles defined between the directors of the liquid crystalline molecules and a film plane, in the thickness direction of the liquid crystal film. In the liquid crystal film used in the present invention, the absolute value of the angle formed by a director in the vicinity of one of the film surfaces and the film surface is generally from 20 to 90 degrees, preferably from 40 to 80 degrees, more preferably from 50 to 60 degrees while the absolute value of the angle formed by the director and the other film surface is generally from 0 to 20 degrees, preferably from 0 to 10 degrees. The absolute value of the average tilt angle is generally from 5 to 45 degrees, preferably 20 to 45 degrees, more preferably 25 to 35 degrees.

The average tilt angle, if deviating from the above ranges, would cause the contrast of the resulting liquid crystal display device to decrease when the device is viewed from an oblique direction. The average tilt angle can be determined by applying a crystal rotation method.

The liquid crystal film forming the first optically anisotropic layer used in the present invention comprises a liquid crystalline polymeric compound or a liquid crystalline polymeric composition as described above with a fixed nematic hybrid orientation and a specific average tilt angle but may be formed from any liquid crystalline material as long as the material can be aligned in a nematic hybrid orientation and satisfies the requirement concerning the specific average tilt angle, as described above. For example, the film may be a liquid crystal film produced by allowing a low molecular weight liquid crystalline material to be in a liquid crystal state, and then aligning the material in a nematic hybrid orientation and fixing the aligned orientation by photo- or thermal-cross-linking. The term "liquid crystal film" used herein refers to those produced by forming a liquid crystalline substance such as a low molecular weight or polymeric liquid crystalline substance into a film, regardless of whether or not the liquid crystal film itself exhibits liquid crystallinity.

With regard to an apparent retardation value in the plane of a liquid crystal film forming the first optically anisotropic layer when viewed from the normal direction thereof, the refractive index ($n_e$) in the direction parallel to directors is different from the refractive index ($n_o$) in the direction perpendicular to directors, in a liquid crystal film with a fixed nematic hybrid orientation structure and, therefore, assuming that the value obtained by subtracting no from ne (ne−no) is an apparent birefringence, an apparent retardation value is given as the product of the apparent birefringence and the absolute film thickness. This retardation value is easily obtained by a polarization optical measurement such as ellipsometry. The retardation value of the liquid crystal film used as the optically anisotropic layer is from 50 to 140 nm with respect to a monochromic light of 550 nm. A retardation value of smaller than 50 nm would result in failure to attain a sufficient viewing angle widening effect. A retardation value of larger than 140 nm would cause unnecessary coloration on the liquid crystal display device when viewed obliquely.

The average tilt angle and retardation value of the liquid crystal film forming the first optically anisotropic layer are necessarily within the above-described ranges. The thickness of the film varies depending on the physical properties of the liquid crystalline polymer or liquid crystalline compound forming the first optically anisotropic layer but is usually from 0.2 to 10 μm, preferably from 0.3 to 5 μm, particularly preferably from 0.5 to 2 μm. A film thickness of less than 0.2 μm would fail to attain a sufficient compensation effect. A film thickness of greater than 10 μm would cause unnecessary colored image in the liquid crystal display device.

The specific conditions for the arrangement of the optical anisotropic layers in the liquid crystal display device of the present invention will be described in more details. In order to describe the specific arrangement conditions, the upper and lower planes and tilt direction of the optically anisotropic layer formed of a liquid crystal film and the pre-tilt direction of the liquid crystal cell are defined as follows using FIGS. 1 to 3.

When the upper and lower planes of the optically anisotropic layer formed of the liquid crystal film are defined by the angles formed by the directors of the liquid crystalline molecules in the vicinity of the film interfaces and the film planes, the plane forming an angle of 20 to 90 degrees at the acute angle side with the director is defined as "b-plane", while the plane forming an angle of 0 to 20 degrees at the acute angle side with the director is defined as "c-plane".

Figure 2:
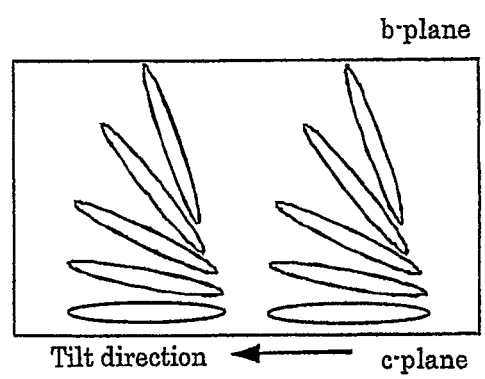
FIG. 2 is a conceptual view for describing the aligned structure of the liquid crystal film forming the second optically anisotropic layer.
Figure 3:
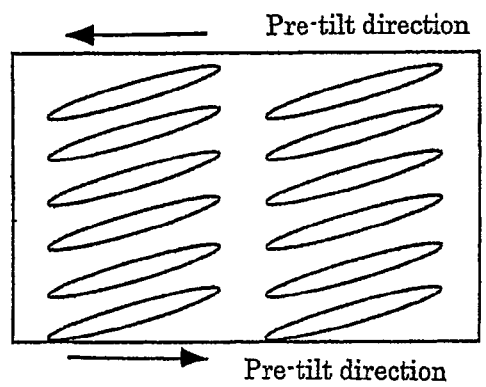
FIG. 3 is a conceptual view for describing the pre-tilt direction of the liquid crystal cell.

When c-plane is viewed from b-plane through the optically anisotropic layer, the direction in which the angles between the directors of the liquid crystal molecules and the projection thereof to the c-plane are acute and which is parallel to the projection is defined as "tilt direction" (see FIGS. 1 and 2).

Next, on the cell interface of the liquid crystal cell, the low molecular weight liquid crystal for driving the liquid crystal cell is not generally parallel to the cell interface and tilted at a certain angle, which angle is generally referred to as "pre-tilt angle". However, a direction along which the director of a liquid crystalline molecule on the cell interface and the projection thereof form an acute angle and which is parallel to the projection is herein defined as "pre-tilt direction of the liquid crystal cell" (see FIG. 3).

The first and second optically anisotropic layers may be attached to one another via an adhesive or tacky adhesive layer.

There is no particular restriction on adhesives for forming the adhesive layer as long as they have enough adhesivity to the optically anisotropic layers and do not harm the optical characteristics of thereof. Examples of the adhesives include acrylic resin-, methacrylic resin-, epoxy resin-, ethylene-vinyl acetate copolymer-, rubber-, urethane-, polyvinylether-based adhesives, and mixtures thereof and various reactive adhesives such as of thermal curing and/or photo curing types, and electron radiation curing types. The adhesive may be an adhesive having a function of a transparent protective layer for protecting the optically anisotropic layers.

There is no particular restriction on tacky adhesives for forming the tacky adhesive layer. There may be used any tacky adhesive appropriately selected from those containing a polymer such as an acrylic polymer, a silicone-based polymer, a polyester, a polyurethane, a polyamide, a polyether, a fluorine- or rubber-based polymer as a base polymer. In particular, it is preferred to use a tacky adhesive such as an acrylic tacky adhesive which is excellent in optical transparency and in optical transparency, weather resistance and heat resistance and readily adjustable in wettability, cohesivity and adhesivity.

The adhesive layer or tacky adhesive layer (hereinafter may be collectively referred to as "tacky/adhesive layer") may be formed by any suitable method. Examples of the method include a method wherein a base polymer or a composition thereof is dissolved or dispersed in a solvent containing toluene or ethyl acetate alone or in combination thereby preparing a tacky/adhesive solution containing 10 to 40 percent by mass of the adhesive, which solution is then directly laid over the above-described optically anisotropic layer by an appropriate developing method such as casting or coating or a method wherein a tacky/adhesive layer is formed in accordance with the method as described above on a separator and then transferred onto the optically anisotropic layers. The tacky/adhesive layer may contain additives such as natural or synthetic resins, in particular fillers or pigments containing tackiness-imparting resins, glass fibers, glass beads, metal powders, and other inorganic powders, dyes, and anti-oxidants. The tacky/adhesive layer may contain fine particles so as to exhibit light diffusivity.

When the optically anisotropic layers are attached to one another via a tacky/adhesive layer, they may be subjected to a surface treatment so as to improve their adhesivity to the tacky/adhesive layer. There is no particular restriction on the method of the surface treatment. There may be suitably used a surface treatment such as corona discharge, sputtering, low-pressure UV irradiation, or plasma treatment, which can maintain the transparency of the liquid crystal film surface. Among these surface treatments, corona discharge treatment is excellent.

Next, explanation will be given to the configurations of the liquid crystal display devices comprising the above-described members, according to the present invention.

The configurations of the liquid crystal display devices of the present invention are necessarily selected from the following four patterns as shown in FIGS. 4, 7, 10 and 13:
  (1) polarizer/liquid crystal cell/first optically anisotropic layer/second optically anisotropic layer/polarizer/backlight;
  (2) polarizer/second optically anisotropic layer/first optically anisotropic layer/liquid crystal cell/polarizer/backlight;
  (3) polarizer/liquid crystal cell/second optically anisotropic layer/first optically anisotropic layer/polarizer/backlight; and
  (4) polarizer/first optically anisotropic layer/second optically anisotropic layer/liquid crystal cell/polarizer/backlight.

The angle formed by the pre-tilt direction of the liquid crystal layer in the liquid crystal cell and the tilt direction of the first optically anisotropic layer formed of a liquid crystal film wherein a nematic hybrid orientation is fixed is preferably from 0 to 30 degrees, more preferably 0 to 20 degrees, particularly preferably from 0 to 10 degrees. The angle of larger than 30 degrees would fail to attain a sufficient viewing angle compensation effect.

The angle formed by the slow axis of the second optically anisotropic layer and the tilt direction of the first optically anisotropic layer is preferably 70 degrees or larger and 110 degrees or smaller, more preferably 80 degrees or larger and 100 degrees or smaller. The angle of larger than 110 degrees or smaller than 70 degrees would cause a reduction in front contrast.

The angle formed by the tilt direction of the first optically anisotropic layer and the absorption axis of the polarizer is preferably 30 degrees or larger and 60 degrees or smaller, more preferably 40 degrees or larger and 50 degrees or smaller. The angle of larger than 60 degrees or smaller than 30 degrees would cause a reduction in front contrast.

The angle formed by the slow axis of the second optically anisotropic layer and the absorption axis of the polarizer is preferably 30 degrees or larger and 60 degrees or smaller, more preferably 40 degrees or larger and 50 degrees or smaller. The angle of larger than 60 degrees or smaller than 30 degrees would cause a reduction in front contrast.

There is no particular restriction on the aforesaid light diffusion layer, backlight, light controlling film, light guide plate and prism sheet, which may be those that have been conventionally used.

In addition to the above-described components, the liquid crystal display device of the present invention may be provided with other additional components. For example, the use of a color filter makes it possible to produce a color liquid crystal display device which can provide multi- or full-colored display images with increased color purity.

APPLICABILITY IN THE INDUSTRY

The liquid crystal display device of the present invention has features that it can provide bright images and is high in front contrast and less in viewing angle dependency.

EXAMPLES

The present invention will be further described in the following examples, but the present invention should not be construed as being limited thereto. The retardations (Δnd) in the examples are values at a wavelength of 550 nm, unless stated otherwise.

1) Measurement of Film Thickness

Measurement of film thickness was carried out using SURFACE TEXTURE ANALYSIS SYSTEM Dektak 3030ST manufactured by SLOAN Co. A method was also used in which the film thickness was determined by interference measurement ("Ultraviolet Visible Near-Infrared Spectrophotometer V-570" available from JASCO Corporation) and refractive index data.

2) Parameter Measurement of Liquid Crystal Film

The measurement was carried out using an automatic birefringence analyzer KOBRA21ADH manufactured by Oji Scientific Instruments.

Example 1

Figure 4:
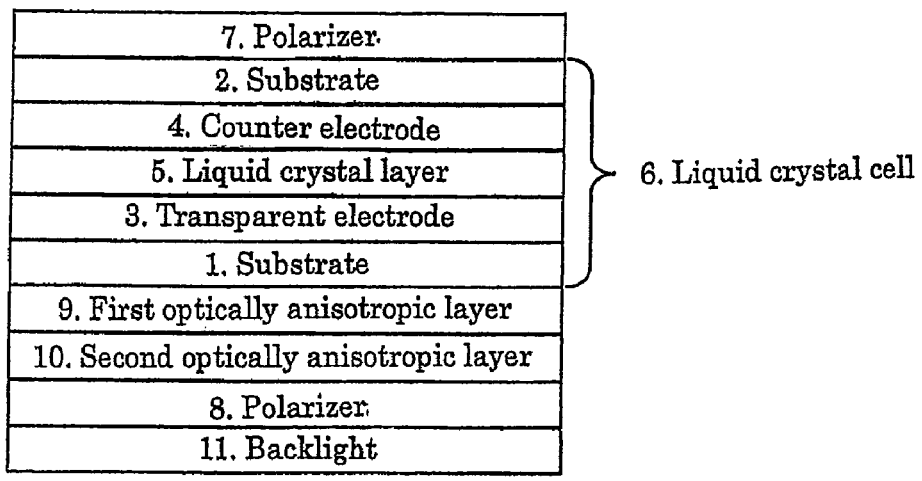
FIG. 4 is a schematic cross-sectional view of the liquid crystal display device of Example 1.

The configuration and axis arrangement of the liquid crystal display device of Example 1 will be described with reference to FIGS. 4 and 5, respectively.

On the substrate 1 is arranged the transparent electrode 3 formed from a highly transmissive material such as ITO while on the substrate 2 is the counter electrode formed from a highly transmissive material such as ITO. The liquid crystal layer 5 formed from a liquid crystalline material exhibiting positive dielectric anisotropy is sandwiched between the transparent electrode 3 and the counter electrode 4. The polarizer 7 is arranged on the side of the substrate 2, opposite to the side on which the counter electrode 4 is formed while the first optically anisotropic layer 9, second optically anisotropic layer 10 and polarizer 8 are arranged on the side of the substrate 1, opposite to the side on which the transparent electrode 3 is formed. The backlight 11 is arranged in the rear side of the polarizer 8, as viewed from the viewer.

In accordance with the disclosures of Japanese Patent Laid-Open Publication No. 6-347742, the first optically anisotropic layer 9 (Δnd: 90 nm) was prepared which layer is formed of a 0.52 µm thick liquid crystal film with a fixed nematic hybrid orientation wherein the average tilt angle in the film thickness direction is 28 degrees. A liquid crystal display device was produced so as to have the axis arrangement as shown in FIG. 5.

The liquid crystal cell 6 used in this example was produced using ZLI-1695 manufactured by Merck Ltd as a liquid crystalline material so that the liquid crystal layer thickness was 4.0 μm. The pre-tilt angle at both of the cell interfaces was 3 degrees, while the Δnd of the liquid crystal cell was approximately 260 nm.

The polarizer 7 (thickness: about 100 μm; SQW-062 manufactured by Sumitomo Chemical Industry Co., Ltd.) was disposed on the viewer's side (the upper portion in FIG. 7) of the liquid crystal cell 6.

In the rear of the liquid crystal cell 6 viewed from the viewer were arranged the liquid crystal film 9 as the first optically anisotropic layer 9, a polymeric stretched film formed of a uniaxially stretched polycarbonate film as the second optically anisotropic layer 10 (Δnd: about 130 nm), and in the rear thereof was arranged the polarizer 8.

Figure 5:
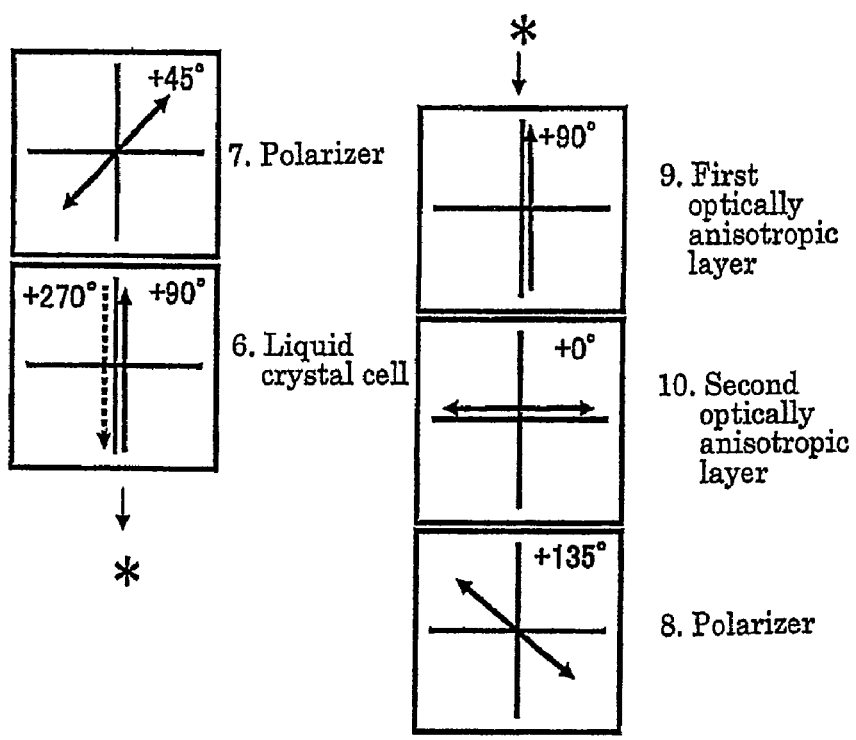
FIG. 5 is a plan view indicating the angular relation of the absorption axis of the polarizer, the pre-tilt direction of the liquid crystal cell, the slow axis of the polymeric stretched film and the tilt direction of the liquid crystal film in Example 1.

The absorption axes of the polarizers 7, 8, the pre-tilt direction of the cell 6 at both of the interfaces, the tilt direction of the liquid crystal film 9 and the slow axis of the polymeric stretched film 10 were oriented as shown in FIG. 5.

Figure 6:
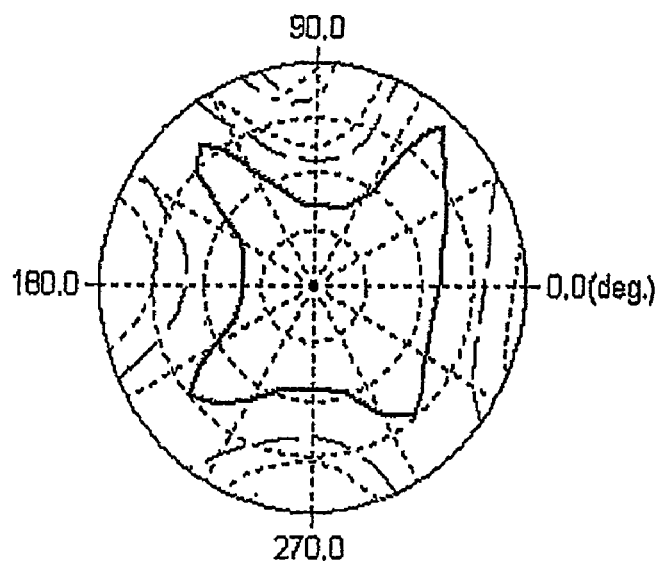
FIG. 6 is a view indicating the contrast ratio when viewing the liquid crystal display device of Example 1 from all the directions.

FIG. 6 shows the contrast ratio from all the directions defined by the transmissivity ratio of white image 0 V and black image 5 V "(white image)/(black image)" when the backlight is on.

It was confirmed from FIG. 6 that the liquid crystal display device had excellent viewing angle characteristics. The concentric circles are drawn to be at an interval of 20 degrees. Therefore, the outermost circle indicates 80 degrees from the center (same applies to the drawings referred below).

Example 2

Figure 7:
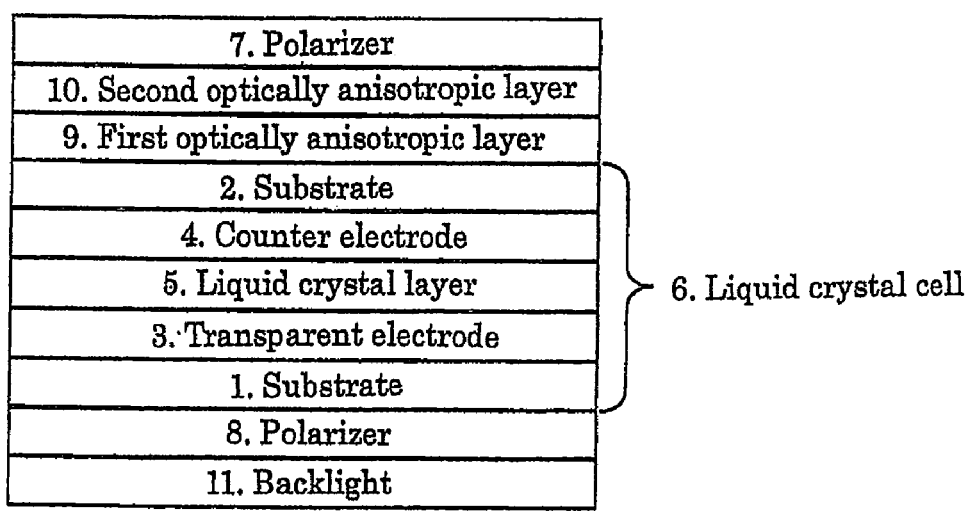
FIG. 7 is a schematic cross-sectional view of the liquid crystal display device of Example 2.

The configuration and axis arrangement of the liquid crystal display device of Example 2 will be described with reference to FIGS. 7 and 8, respectively.

The liquid crystal cell 6 of Example 1 was used. On the side of the substrate 2 opposite to the side on which the counter electrode 4 was formed were arranged a first optically anisotropic layer 9, a second optically anisotropic layer 10 and a polarizer 7. On the side of the substrate 1 opposite to the side on which the transparent electrode 3 was formed was arranged a polarizer 8. A backlight 11 was arranged in the rear of the polarizer 8.

The polarizers 7, 8, first optically anisotropic layer 9, and second optically anisotropic layer 10 were the same as those used in Example 1.

Figure 8:
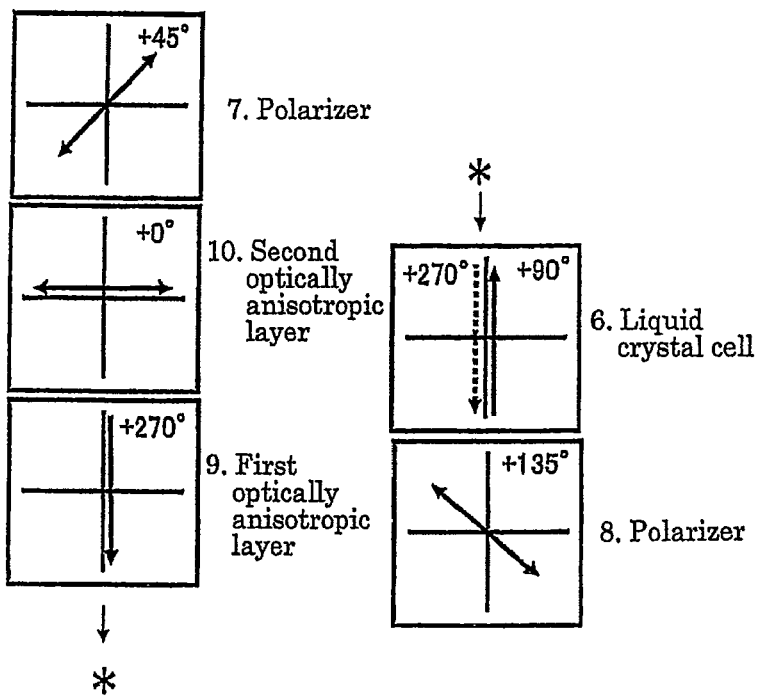
FIG. 8 is a plan view indicating the angular relation of the absorption axis of the polarizer, the pre-tilt direction of the liquid crystal cell, the slow axis of the polymeric stretched film and the tilt direction of the liquid crystal film in Example 2.

The absorption axes of the polarizers 7, 8, the pre-tilt direction of the cell 6 at both of the interfaces, the tilt direction of the liquid crystal film 9 and the slow axis of the polymeric stretched film 10 were oriented as shown in FIG. 8.

Figure 9:
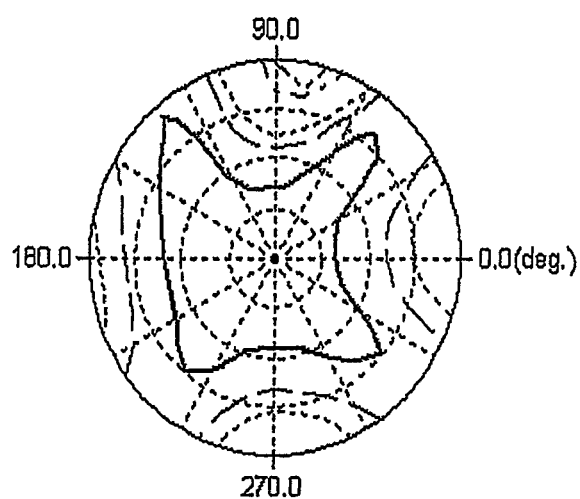
FIG. 9 is a view indicating the contrast ratio when viewing the liquid crystal display device of Example 2 from all the directions.

FIG. 9 shows the contrast ratio from all the directions defined by the transmissivity ratio of white image 0 V and black image 5 V "(white image)/(black image)" when the backlight is on.

It was confirmed from FIG. 9 that the liquid crystal display device had excellent viewing angle characteristics.

Example 3

Figure 10:
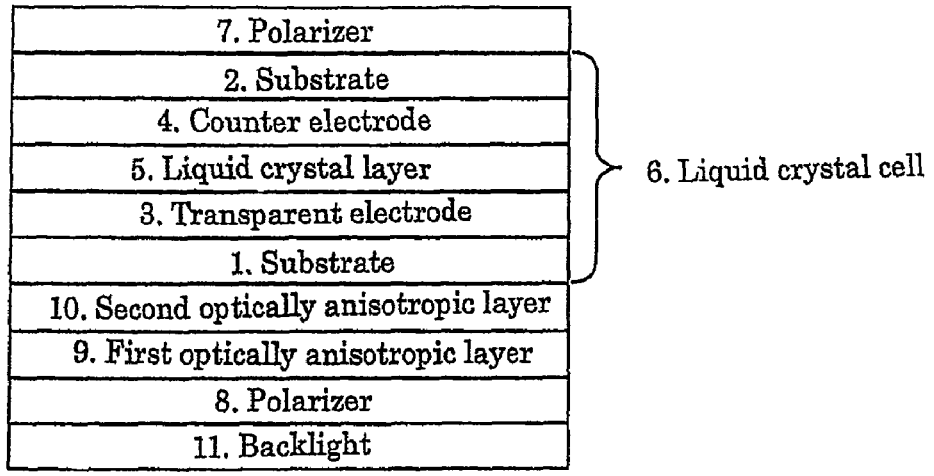
FIG. 10 is a schematic cross-sectional view of the liquid crystal display device of Example 3.
Figure 11:
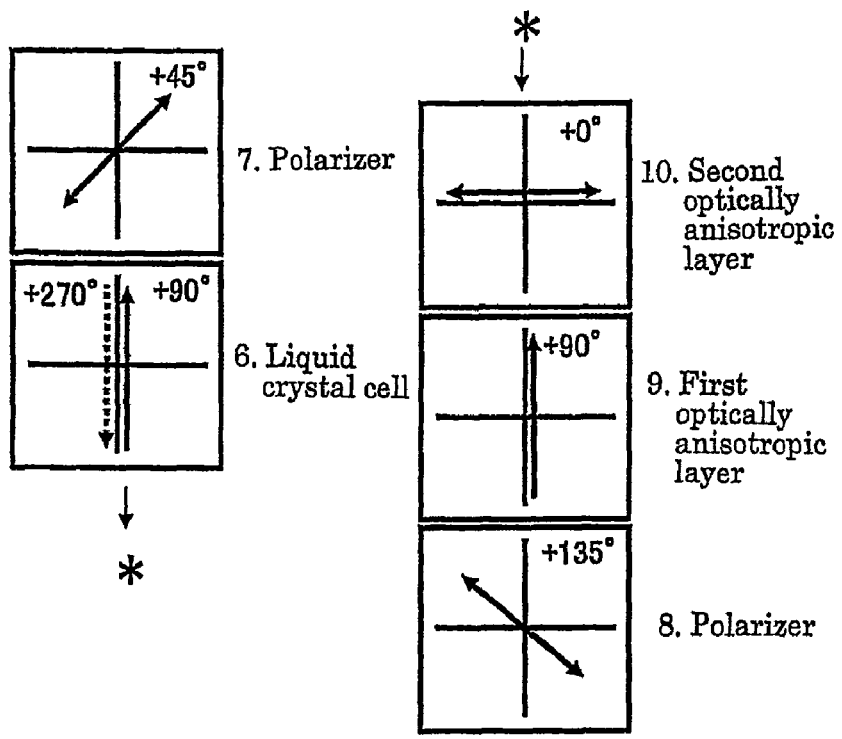
FIG. 11 is a plan view indicating the angular relation of the absorption axis of the polarizer, the pre-tilt direction of the liquid crystal cell, the slow axis of the polymeric stretched film and the tilt direction of the liquid crystal film in Example 3.

The configuration and axis arrangement of the liquid crystal display device of Example 3 will be described with reference to FIGS. 10 and 11, respectively.

The liquid crystal display device of this example was prepared with the same procedures of Example 1 except that the position of the second optically anisotropic layer 10 and the position of the first optically anisotropic layer 9 were switched to one another.

Figure 12:
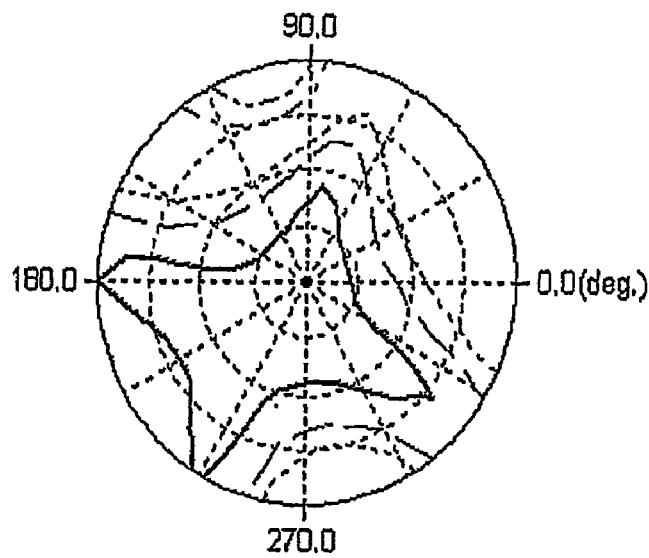
FIG. 12 is a view indicating the contrast ratio when viewing the liquid crystal display device of Example 3 from all the directions.

FIG. 12 shows the contrast ratio from all the directions defined by the transmissivity ratio of white image 0 V and black image 5 V "(white image)/(black image)" when the backlight is on.

It was confirmed from FIG. 12 that the liquid crystal display device had excellent viewing angle characteristics.

Example 4

Figure 13:
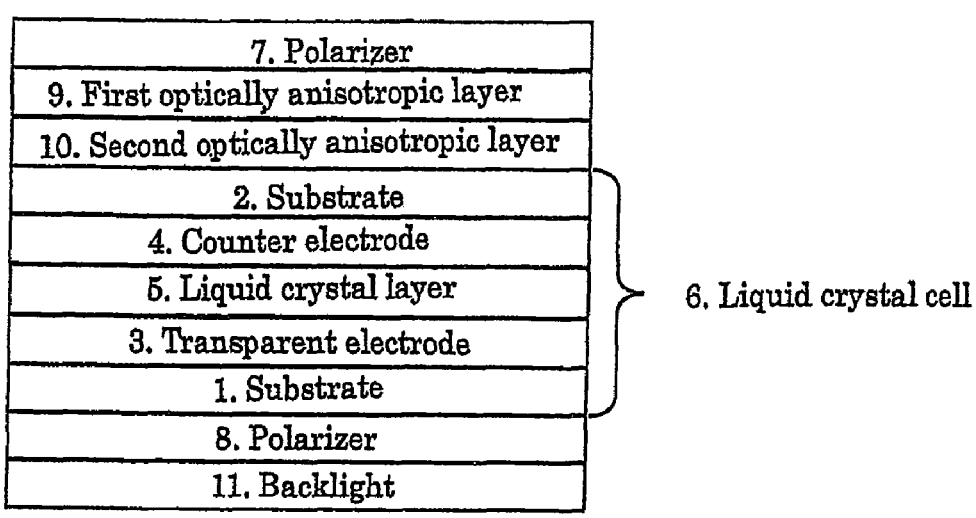
FIG. 13 is a schematic cross-sectional view of the liquid crystal display device of Example 4.
Figure 14:
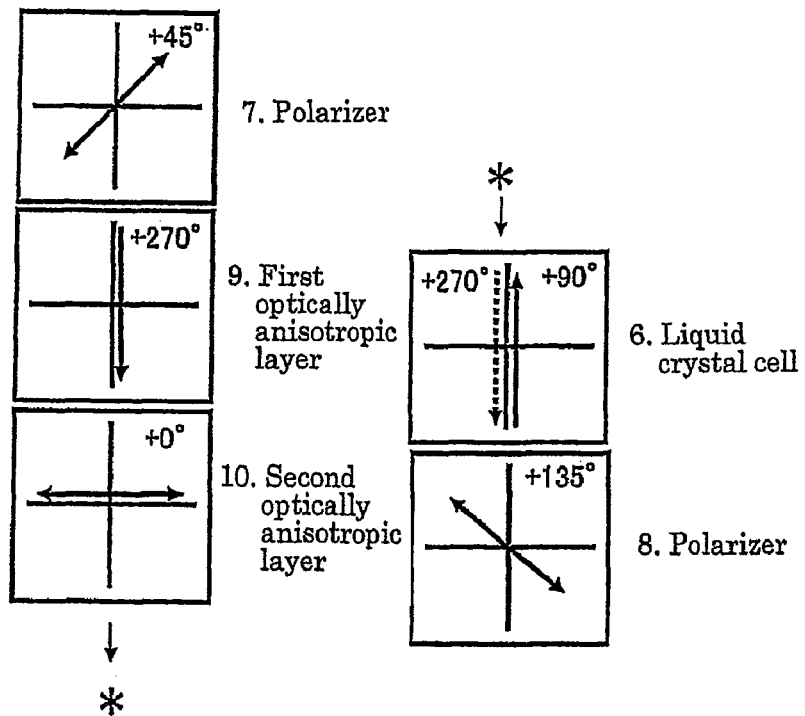
FIG. 14 is a plan view indicating the angular relation of the absorption axis of the polarizer, the pre-tilt direction of the liquid crystal cell, the slow axis of the polymeric stretched film and the tilt direction of the liquid crystal film in Example 4.

The configuration and axis arrangement of the liquid crystal display device of Example 4 will be described with reference to FIGS. 13 and 14, respectively.

The liquid crystal display device of this example was prepared with the same procedures of Example 2 except that the position of the second optically anisotropic layer 10 and the position of the first optically anisotropic layer 9 were switched to one another.

Figure 15:
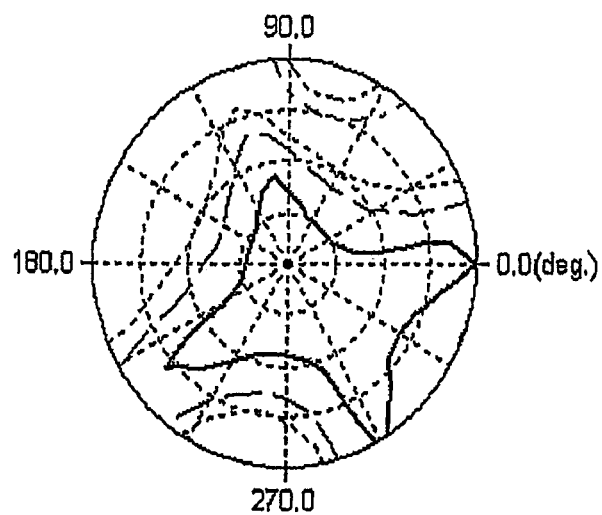
FIG. 15 is a view indicating the contrast ratio when viewing the liquid crystal display device of Example 4 from all the directions.

FIG. 15 shows the contrast ratio from all the directions defined by the transmissivity ratio of white image 0 V and black image 5 V "(white image)/(black image)" when the backlight is on.

It was confirmed from FIG. 15 that the liquid crystal display device had excellent viewing angle characteristics.

Comparative Example 1

Figure 16:
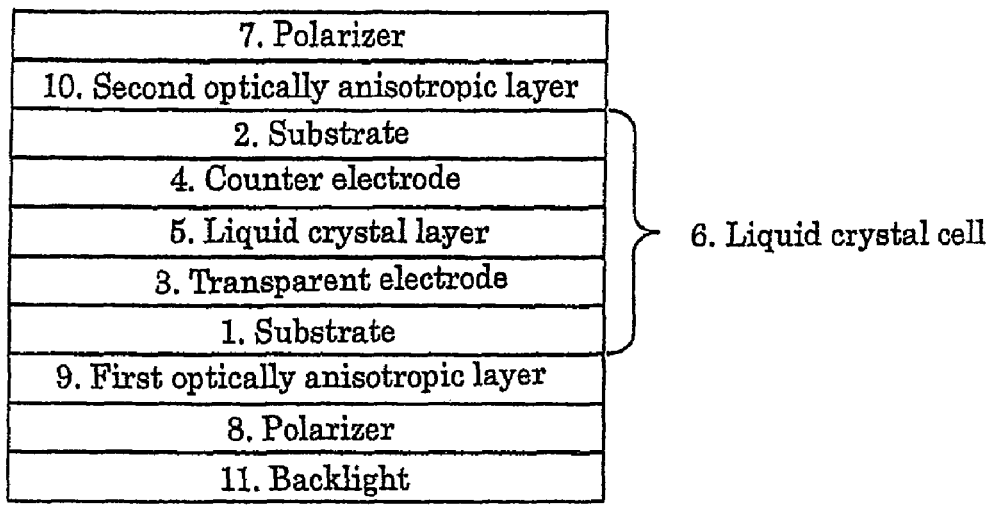
FIG. 16 is a schematic cross-sectional view of the liquid crystal display device of Comparative Example 1.

The configuration of the liquid crystal display device of Comparative Example 1 will be described with reference to FIG. 16. The liquid crystal display device of this example was produced with the same procedures of Example 1 except that the position of the second optically anisotropic layer 10 was shifted from the backlight side of the liquid crystal cell (lower part in FIG. 16) to the viewer's side thereof (upper part in FIG. 16).

Figure 17:
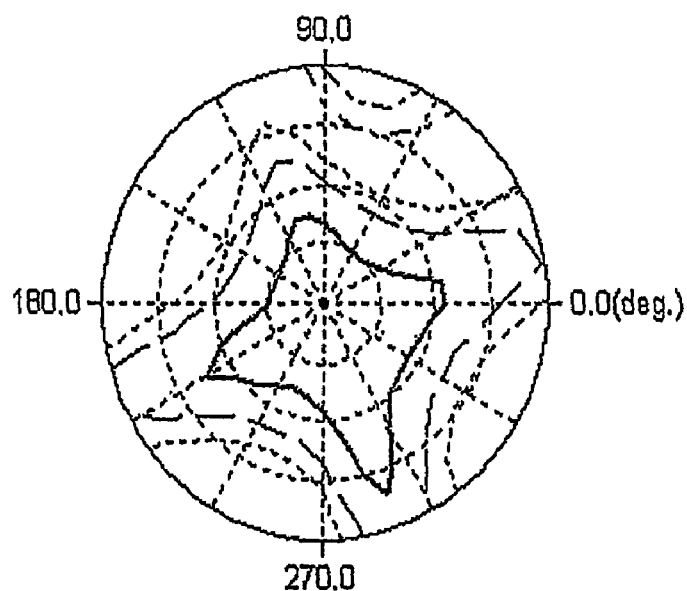
FIG. 17 is a view indicating the contrast ratio when viewing the liquid crystal display device of Comparative Example 1 from all the directions.

FIG. 17 shows the contrast ratio from all the directions defined by the transmissivity ratio of white image 0 V and black image 5 V "(white image)/(black image)" when the backlight is on.

With regard to viewing angle characteristics, Example 1 and Comparative Example 1 are compared.

Comparing the contrast contour lines shown in FIGS. 6 and 17, it is confirmed that viewing angle characteristics are significantly improved when the second optically anisotropic layer 10 was disposed in the backlight side of the liquid crystal cell.

In these examples, the experiments were carried out without using a color filter. Of course, the provision of a color filter in the liquid crystal cell can provide excellent multi-color or full-color images.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A transmissive liquid crystal display device comprising at least:
   a backlight;
   a polarizer;
   a second optically anisotropic layer with a retardation of 80 to 180 nm at a wavelength of 550 nm;
   a first optically anisotropic layer with a retardation of 50 to 140 nm at a wavelength of 550 nm;

a homogeneously aligned liquid crystal cell of ECB mode comprising upper and lower substrates facing each other and a liquid crystal layer sandwiched between the upper and lower substrates; and a polarizer, arranged in piles in this order from the backlight, the first optically anisotropic layer comprising at least a liquid crystal film with a fixed nematic hybrid liquid crystal orientation structure, an angle formed by a slow axis of the second optically anisotropic layer and a tilt direction, projected to a plane, of the hybrid orientation of the liquid crystal film forming the first optically anisotropic layer being in the range of 70 to 110 degrees, and the liquid crystal film of the first optically anisotropic layer being produced by fixing a liquid crystalline substance exhibiting an optically positive uniaxiality, in a nematic hybrid orientation formed when the substance is in the liquid crystal state, and the average tilt angle of the nematic hybrid orientation being in a range of 5 to 45 degrees.

2. A transmissive liquid crystal display device comprising at least:

a backlight;

a polarizer;

a homogeneously aligned liquid crystal cell of ECB mode comprising upper and lower substrates facing each other and a liquid crystal layer sandwiched between the upper and lower substrates;

a first optically anisotropic layer with a retardation of 50 to 140 nm at a wavelength of 550 nm;

a second optically anisotropic layer with a retardation of 80 to 180 nm at a wavelength of 550 nm; and a polarizer, arranged in piles in this order from the backlight, the first optically anisotropic layer comprising at least a liquid crystal film with a fixed nematic hybrid liquid crystal orientation structure, an angle formed by a slow axis of the second optically anisotropic layer and a tilt direction, projected to a plane, of the hybrid orientation of the liquid crystal film forming the first optically anisotropic layer being in the range of 70 to 110 degrees, and the liquid crystal film of the first optically anisotropic layer being produced by fixing a liquid crystalline substance exhibiting an optically positive uniaxiality, in a nematic hybrid orientation formed when the substance is in the liquid crystal state, and the average tilt angle of the nematic hybrid orientation being in a range of 5 to 45 degrees.

3. A transmissive liquid crystal display device comprising at least:

a backlight;

a polarizer;

a first optically anisotropic layer with a retardation of 50 to 140 nm at a wavelength of 550 nm;

a second optically anisotropic layer with a retardation of 80 to 180 nm at a wavelength of 550 nm;

a homogeneously aligned liquid crystal cell of ECB mode comprising upper and lower substrates facing each other and a liquid crystal layer sandwiched between the upper and lower substrates; and a polarizer, arranged in piles in this order from the backlight, the first optically anisotropic layer comprising at least a liquid crystal film with a fixed nematic hybrid liquid crystal orientation structure, an angle formed by a slow axis of the second optically anisotropic layer and a tilt direction, projected to a plane, of the hybrid orientation of the liquid crystal film forming the first optically anisotropic layer being in the range of 70 to 110 degrees, and the liquid crystal film of the first optically anisotropic layer being produced by fixing a liquid crystalline substance exhibiting an optically positive uniaxiality, in a nematic hybrid orientation formed when the substance is in the liquid crystal state, and the average tilt angle of the nematic hybrid orientation being in a range of 5 to 45 degrees.

4. A transmissive liquid crystal display device comprising at least:

a backlight;

a polarizer;

a homogeneously aligned liquid crystal cell of ECB mode comprising upper and lower substrates facing each other and a liquid crystal layer sandwiched between the upper and lower substrates;

a second optically anisotropic layer with a retardation of 80 to 180 nm at a wavelength of 550 nm;

a first optically anisotropic layer with a retardation of 50 to 140 nm at a wavelength of 550 nm;

and a polarizer, arranged in piles in this order from the backlight, the first optically anisotropic layer comprising at least a liquid crystal film with a fixed nematic hybrid liquid crystal orientation structure, an angle formed by a slow axis of the second optically anisotropic layer and a tilt direction, projected to a plane, of the hybrid orientation of the liquid crystal film forming the first optically anisotropic layer being in the range of 70 to 110 degrees, and the liquid crystal film of the first optically anisotropic layer being produced by fixing a liquid crystalline substance exhibiting an optically positive uniaxiality, in a nematic hybrid orientation formed when the substance is in the liquid crystal state, and the average tilt angle of the nematic hybrid orientation being in a range of 5 to 45 degrees.

5. The transmissive liquid crystal display device according to claim 1, wherein the second optically anisotropic layer is a stretched polymer film.

6. The transmissive liquid crystal display device according to claim 1, wherein the second optically anisotropic layer is a liquid crystal film produced by fixing a liquid crystalline substance exhibiting an optically positive uniaxiality, in a nematic orientation formed when the substance is in the liquid crystal state.

7. The transmissive liquid crystal display device according to claim 1, wherein the angle defined by the tilt direction of the hybrid direction of the liquid crystal film forming the first optically anisotropic layer, projected to a plane and the rubbing direction of the liquid crystal layer is in the range of 30 degrees or smaller.

8. The transmissive liquid crystal display device according to claim 2, wherein the second optically anisotropic layer is a stretched polymer film.

9. The transmissive liquid crystal display device according to claim 2, wherein the second optically anisotropic layer is a liquid crystal film produced by fixing a liquid crystalline substance exhibiting an optically positive uniaxiality, in a nematic orientation formed when the substance is in the liquid crystal state.

10. The transmissive liquid crystal display device according to claim 2, wherein the angle defined by the tilt direction of the hybrid direction of the liquid crystal film forming the first optically anisotropic layer, projected to a plane and the rubbing direction of the liquid crystal layer is in the range of 30 degrees or smaller.

11. The transmissive liquid crystal display device according to claim 3, wherein the second optically anisotropic layer is a stretched polymer film.

12. The transmissive liquid crystal display device according to claim 3, wherein the second optically anisotropic layer is a liquid crystal film produced by fixing a liquid crystalline substance exhibiting an optically positive uniaxiality, in a nematic orientation formed when the substance is in the liquid crystal state.

13. The transmissive liquid crystal display device according to claim 3, wherein the angle defined by the tilt direction of the hybrid direction of the liquid crystal film forming the first optically anisotropic layer, projected to a plane and the rubbing direction of the liquid crystal layer is in the range of 30 degrees or smaller.

14. The transmissive liquid crystal display device according to claim 4, wherein the second optically anisotropic layer is a stretched polymer film.

15. The transmissive liquid crystal display device according to claim 4, wherein the second optically anisotropic layer is a liquid crystal film produced by fixing a liquid crystalline substance exhibiting an optically positive uniaxiality, in a nematic orientation formed when the substance is in the liquid crystal state.

16. The transmissive liquid crystal display device according to claim 4, wherein the angle defined by the tilt direction of the hybrid direction of the liquid crystal film forming the first optically anisotropic layer, projected to a plane and the rubbing direction of the liquid crystal layer is in the range of 30 degrees or smaller.

17. The transmissive liquid crystal display device according to claim 1, wherein:
  (i) an angle formed by a pre-tilt direction of the liquid crystal layer of the liquid crystal cell and the tilt direction of the first optically anisotropic layer is in the range of 0 to 30 degrees,
  (ii) an angle formed by the tilt direction of the first optically anisotropic layer and an absorption axis of the polarizer is in the range of 30 to 60 degrees, and
  (iii) an angle formed by the slow axis of the second optically anisotropic layer and the absorption axis of the polarizer is between 30 to 60 degrees.

18. The transmissive liquid crystal display device according to claim 2, wherein:
  (i) an angle formed by a pre-tilt direction of the liquid crystal layer of the liquid crystal cell and the tilt direction of the first optically anisotropic layer is in the range of 0 to 30 degrees,
  (ii) an angle formed by the tilt direction of the first optically anisotropic layer and an absorption axis of the polarizer is in the range of 30 to 60 degrees, and
  (iii) an angle formed by the slow axis of the second optically anisotropic layer and the absorption axis of the polarizer is between 30 to 60 degrees.

19. The transmissive liquid crystal display device according to claim 3, wherein:
  (i) an angle formed by a pre-tilt direction of the liquid crystal layer of the liquid crystal cell and the tilt direction of the first optically anisotropic layer is in the range of 0 to 30 degrees,
  (ii) an angle formed by the tilt direction of the first optically anisotropic layer and an absorption axis of the polarizer is in the range of 30 to 60 degrees, and
  (iii) an angle formed by the slow axis of the second optically anisotropic layer and the absorption axis of the polarizer is between 30 to 60 degrees.

20. The transmissive liquid crystal display device according to claim 4, wherein:
  (i) an angle formed by a pre-tilt direction of the liquid crystal layer of the liquid crystal cell and the tilt direction of the first optically anisotropic layer is in the range of 0 to 30 degrees,
  (ii) an angle formed by the tilt direction of the first optically anisotropic layer and an absorption axis of the polarizer is in the range of 30 to 60 degrees, and
  (iii) an angle formed by the slow axis of the second optically anisotropic layer and the absorption axis of the polarizer is between 30 to 60 degrees.

* * * * *